UNITED STATES PATENT OFFICE.

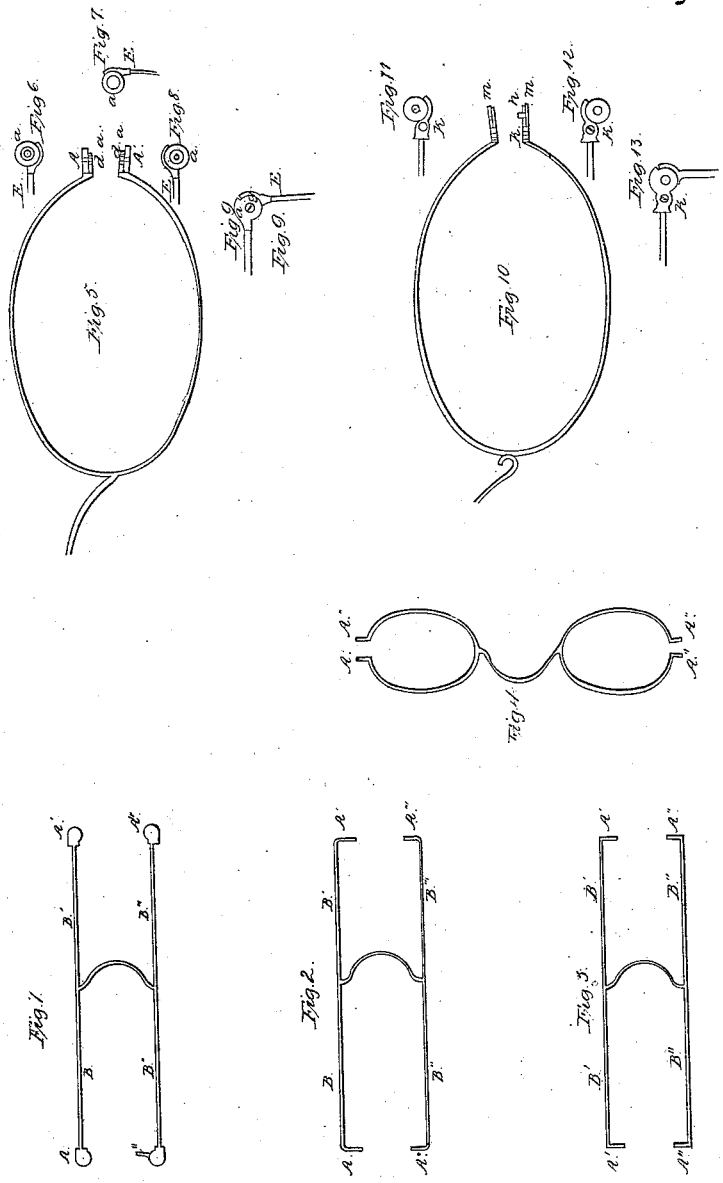

HENRY HAMMOND, OF HARTFORD, CONNECTICUT.

IMPROVEMENT IN MANUFACTURE OF SPECTACLE-FRAMES.

Specification forming part of Letters Patent No. 57,896, dated September 11, 1866.

*To all whom it may concern:*

Be it known that I, HENRY HAMMOND, of Hartford, county of Hartford, State of Connecticut, have invented certain new and useful Improvements in the Manufacture of Spectacle-Frames; and I do hereby declare that the following is a full and exact description thereof, reference being had to the accompanying drawings, and to letters of reference marked thereon.

In the manufacture of spectacles it has been customary to divide the frame into parts technically termed "temples" and the "front," the former term being applied to the two side pieces, and the latter to the part composed of the nose and eye pieces. These parts have been made up from different pieces united by soldering, brazing, riveting, and by screws.

My improvements relate to the manufacture of that part of the spectacle-frames called the "front."

In the drawings, Figure 1 is a view of the blank (cut from a sheet of metal) from which the front or principal part of the frame is to be formed. Fig. 2 shows the same twisted so as to bring the ends A A′ A″ A‴ to the proper position to be joined with the temple-pieces after they are bent by the succeeding operation. Fig. 3 shows the blank with portions of it rounded and shaped by being struck up in a die. Fig. 4 shows the fronts after the parts B B′ B″ B‴ have been formed to receive the eyeglasses. Figs. 5, 6, 7, 8, and 9 show the form of joint I use. Figs. 10, 11, 12, 13 show another form of joint, such as is ordinarily used.

I will now describe my process of manufacture.

I first form the blank, Fig. 1, by cutting the same from sheet metal by means of a die or punch or similar mechanical device. I then twist the parts B B′ B″ B‴ of this piece so as to bring the ends A A′ A″ A‴ to a position at right angles to that occupied by them in Fig. 1, as shown in Fig. 2. These pieces are then placed in a die and rounded or shaped as shown in Fig. 3. The ends A A′ A″ A‴ are then struck up in a die in the form shown in Figs. 5, 6, 7, 8, and 9 at *a*.

My improvements in the form of joint I will now explain.

They consist in forming the studs *d d* on the interior of the ends A A′ A″ A‴, so as to form a pivot on which the piece E turns, fastened by a screw, *g*, through the center of these studs *d d*. Instead of this arrangement that shown in Figs. 10, 11, 12, 13 is ordinarily used, consisting of a projecting stud, *h*, riveted into one part of the end *m m*, Fig. 10, the two parts being joined by a screw at *k*.

I also use as a variation on my improved joint a connection formed by striking or milling up the studs *d d* in place of the stud or rivet *h*, and uniting the parts by the screw at *k*, as shown in Figs. 10, 11, 12, 13.

The advantages I obtain by this method of manufacture are, first, cheapness of construction, as I employ very little hand-work, every part being formed by machinery; also, by forming the fronts in one piece I avoid a large amount of soldering, brazing, &c., and consequently form stronger frames; also, by striking up the parts in dies I impart to them a hardness and elasticity which is desirable, and in my form of joint I have a much more compact joint than that ordinarily used, and one that may be formed from the same piece of stock as the front without soldering or riveting.

Now, having described my invention, what I claim as new, and desire to secure by Letters Patent, is—

1. The method herein described and shown of forming spectacle-fronts in one piece out of sheet metal.

2. The stud *d* on the end A, serving as a pivot for the temple, and through which the screw passes to fasten the ends A one to the other.

HENRY HAMMOND.

Witnesses:
J. B. GARDINER,
T. J. VAIL.